United States Patent [19]

Gaianigo

[11] Patent Number: 4,799,644
[45] Date of Patent: Jan. 24, 1989

[54] ACTUATOR ACTIVATING ON-OFF VALVES

[75] Inventor: Umberto Gaianigo, Montecchio Maggiore, Italy

[73] Assignee: G.T.I. du Gaianigo Umberto & Co. Snc, Maggiore, Italy

[21] Appl. No.: 143,071

[22] Filed: Jan. 12, 1988

[30] Foreign Application Priority Data

Feb. 16, 1987 [IT] Italy ............................... 85510 A/87

[51] Int. Cl.$^4$ ..................... F16K 31/143; F16K 31/54
[52] U.S. Cl. ............................................ 251/14; 74/32;
74/33; 74/89.12; 74/424.8 VA; 251/58;
251/229; 251/250; 251/267
[58] Field of Search ................... 251/14, 58, 229, 250,
251/266, 267; 74/29, 32, 33, 89.11, 89.12, 424.8
VA

[56] References Cited

U.S. PATENT DOCUMENTS

| | | | |
|---|---|---|---|
| 2,608,374 | 8/1952 | Morehead | 251/14 |
| 2,954,703 | 10/1960 | Morrell | 251/250 |
| 2,974,921 | 3/1961 | Kaswan | 251/250 |
| 3,007,487 | 11/1961 | Adams | 251/14 |
| 3,195,418 | 7/1965 | Zukas | 251/250 |
| 4,493,336 | 1/1985 | Renfro | 251/14 |

*Primary Examiner*—George L. Walton
*Attorney, Agent, or Firm*—Birch, Stewart, Kolasch & Birch

[57] ABSTRACT

The invention concerns an actuator for the operation of on-off valves. Said actuator includes a supporting body (1) in which there is transversally disposed at least one pneumatic cylinder (8, 9) which is capable of activating in two directions, a rack (7) which in turn is engaged with a cogged wheel (31; 50; 100) co-axial with the central shaft (15, 66, 104) of said actuator and able to transmit its own rotation through a pair of free wheels (27, 28; 61, 62; 109, 110) which rigidly and alternatively engage themselves in discordant directions with a ring (33, 34; 62, 63; 108) integral with the central shaft of the actuator, and pneumatic pistons for achieving the relative axial movement between the cogged wheel and the shaft of the actuator. Depending on the mutual distance between the free wheels, and in the absence of the pneumatic signal, the actuator has its central shaft blocked or manually maneuvereable. Moreover, besides the direct rotation of the throttle valve being integral with the shaft of the actuator, the operation of the guillotine-type valves is achieved by providing the shaft of the actuator with a screw chamber and a screw (69) integrated with said chamber for controlling the guillotine-type opening and closing of the valve.

14 Claims, 3 Drawing Sheets

ACTUATOR ACTIVATING ON-OFF VALVES

The present invention relates to the utilization of an activator for the activation of on-off valves.

Actuators are devices allowing the remote control of on-off valves.

A known type of actuator consists of a rack, usually obtained on the shaft of a double-effect pneumatic piston, which transmits the movement to a cogged wheel which it engages with, where the cogged wheel is connected with the control shaft of the on-off valve.

The opening and closing of the valve depends on the direction in which the compressed air entering the cylinder pushes the piston and, therefore, the rack fastened on its shaft.

The actuators of this type present the inconvenience of having very bulky dimensions, particularly in those installations where considerable opening and closing torques are necessary, because of the high pressure in the networks.

In fact, in such cases, the purpose of obtaining high opening and closing torques is reached by increasing the diameter of the cogged wheel connected with the control shaft of the valve. This brings, as a consequence, the inevitable increase in the stroke of the shafts and, therefore, the need for longer pistons. As an alternative, the diameters of the cogged wheels and the housings of the shafts can be kept unaltered, but, in that case the diameters of the cogged wheels must be increased, which at any rate brings about increased overall dimensions.

Another inconvenience presented by actuators of this type is represented by the fact that they do not allow the choking of the valve, neither during the closing, nor during the opening process.

Another known type of actuator is the diaphragm actuator. This actuator consists of a metal body, inside of which is positioned an elastic diaphragm, which devides it into two chamber, which are independent from each other, into which air under pressure is introduced. The shaft activating the on-off valve is rigidily connected with the diaphragm. The opening and closing of the on-off valve are performed by introducing air under pressure alternatively into the two chambers.

Although this type of actuator solves the problem of choking the valve, which can easily be obtained by correctly adjusting the pressure and the counter-pressure within the chambers, and, therefore on the elastic diaphragm, it does not solve the problems concerning the overall dimensions, which remain bulky, especially when the valves used are of the flat type, since, because of their characteristic construction, they create strong counter-pressure both while opening and closing.

Moreover, in such a case, if the valve is choked, any pressure varition in the network implies a variation in the opening of the valve itself, with consequent variations in the flow rate, which may cause serious problems to the installation.

Yet another type of actuator is the actuator with a pneumatic clutch and a rack.

In this type of actuator, a metal drum is integrally connected with the shaft operating the on-off valve. Externally to and concentrically with the drum is mounted a clutch. It consists of a hollow ring with a rectangular cross section, the outside surface of which is flexible and covered with antifriction material in correspondence with the inside diameter.

When the pressure of the hollow ring is discharged, the clutch disconnects itself and becomes idle in relation to the drum and the drum stops, the rack feels the displacement and the clutch goes back to its initial position, by performing in the opposite direction the same angular rotation which it had performed before.

At this point the cycle begins again until the valve is completely closed or opened.

It becomes apparent that this type of actuator does not solve the problem of the bulky dimensions, although it allows an optimum choking of the valves.

In fact in this case, too, should high opening or closing torques be required, they are obtainable only by employing clutches and drums with bulky dimensions.

Another inconvenience of said types of actuators is that they require a very long period for the operation.

The purpose of the present invention is that of eliminating the listed inconveniences.

One of the proposed goals which will be reached with the realization of the invention, is the construction of an actuator, which, when compared with the other known types, having the same capacity, is more compact and with reduced dimensions, particularly in relation to the activating piston-rack assembly. As a consequence, an actuator will be obtained, which, although having more reduced dimensions in comparison with other actuators presenting similar characteristics, can develop higher opening and closing torques.

Anther proposed goal is the possibility of allowing a very powerful choking of the valves with the possibility of varying it at discretion within a certain range.

Yet another proposed goal is that such an actuator may allow, in the case of a break-down, according to the requirements, either the blocking of the valve-operating shaft or, on the contrary, the possibility of operating it manually, whether anti-accident requirements or other reasons force or suggest one choice or the other.

The just listed purposes and other which will be better illustrated hereafter, are reached with the realization of an actuator for the activation of on-off valves, including a supporting body, in which a pair consisting of a rack and a cogged wheel is lodged. The cogged wheel is made to move axially and concentrically in relation to the shaft activating the valve by the action of ring-shaped pistons belonging to opposed and equal pneumatic pistons, which are found within the actuator and are penumatically activated and rigidly connected with it. The actuator is characterized by the fact that it supports within itself two free wheels, each of which can be made alternatively integral with the shaft activating the on-off valve, so as to transmit the rotation either in a clockwise or counter-clockwise direction.

According to the present invention, in a preferred form of exeuction it is foreseen that the relative axial movement between the cogged wheel and the central shaft of the actuator is obtained by activating alternatively one of the two pistons of the respective cylinders co-axially disposed within the body of the actuator. Another form of execution foresees the presence of a single double-effect cylinder, being co-axial with the shaft. Following the operation requirements, the pair of free wheels, being connected with the cogged wheels can be arranged at such a distance from each other so that when they are at rest, two separate and oppostie conditions may occur. More precisely, should the two free wheels be arranged far apart from each other, so that the distance between the two is greater than the height of the ring or greater than the distance between the rings integrated with the central shaft of the actuator, it happens that, when the pneumatic signal is absent, the central shaft of the actuator is free to rotate by manually operating the handwheel. If, on the other hand, the distance between the two free wheels is smaller than the height of the ring, or smaller than the distance between the rings integrated with the central shaft, it happens that, when the pneumatic signal is absent, the central shaft is blocked, so that any movement is prevented.

Thus, should the shaft of the actuator open or close a throttle valve, said valve will be directly connected with the shaft, so that any rotation of the latter will correspond with a rotation of the throttle valve.

On the other hand, should the actuator control a gate valve, the central shaft of the actuator would present a co-axial nut screw, obtained within the shaft itself, which axially moves a screw being integral with said gate valve.

Thanks to the utilization of the actuator according to the present invention, operating the on-off valves, a first economic advantage is obtained, consisting in the reduction of costs, arising also from the reduction of dimensions.

A second advantage arises from a reduced consumption of compressed air which is made possible by such an actuator, in comparison with other types of actuators, particularly the ones with a clutch presenting similar characteristics.

Other constructive and functional details will be better illustrated in the description of three preferred forms of execution of the invention, which are given by way of illustration only, but are not meant to limit its scope, and are illustrated in the enclosed drawings where:

Figure 1:
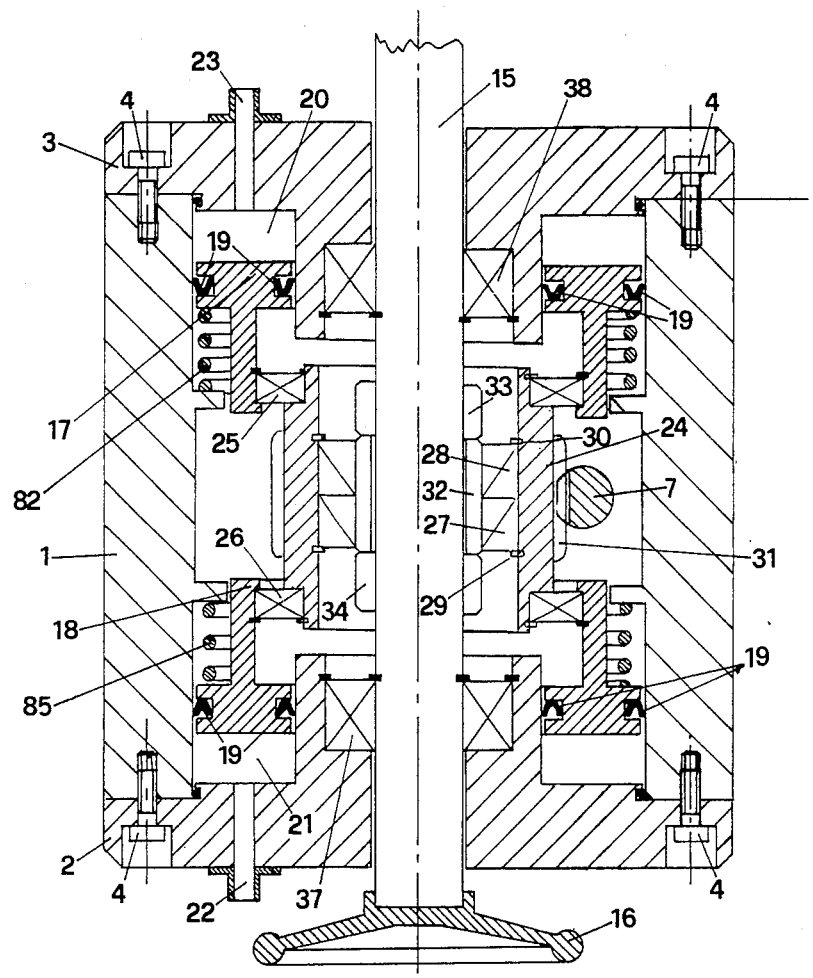
FIG. 1 represents the present cross-section of the actuator according to the invention.
Figure 2:
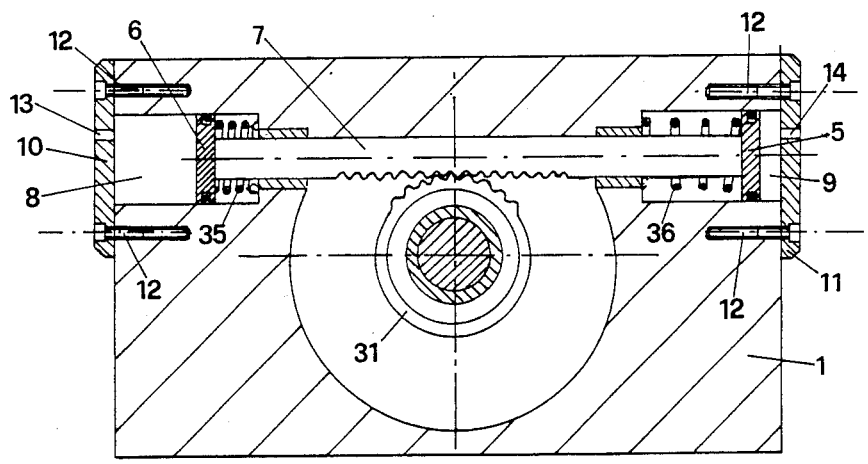
FIG. 2 represents the cross-section of the coupling between the rack and the cogged wheel of the actuator of FIG. 1.

With reference to the above-mentioned figures, the actuator consist of a body 1 closed by the flanges 2 and 3 which are blocked on said body by the screws 4.

Within body 1 are provided the seats for the sliding of the lateral pistons 5 and 6, which are connected with rack 7. The rack displaces itself alternatively to the right or to the left because of the action of the compressed air being introduced into the chambers 8 or 9 through the holes 13 and 14 obtained in the closing flanges 10 and 11.

The flanges 10 and 11 are secured to the body 1 by means of screws 12, while the pistons 5 and 6 are provided with return springs 35 and 36.

By observing FIG. 1 it can be noticed that the body 1 of the actuator is traversed though its entire length by the control shaft 15 of the on-off valve which is to be operated. The rod is supported by the bearings 37 and 38 and it carries at its end a handwheel 16 for the manual operation.

Also inside body 1 and co-axial with shaft 15 are provided two ring-shaped pistons 17 and 18, one opposed to the other, and respectively provided with return springs 82 and 85, which slide axially. The seal at the lateral sliding surfaces is obtained by means of the washers 19.

Through holes 22 and 23 which are present in the top flanges 2 and 3, compressed air is introduced into the sealed ring-shaped chamber 20 and 21 which, thanks to the presence of the pistons 17 and 18, constitute actual pneumatic cylinders.

The ring-shaped sliding pistons 17 and 18 are connected with the sleeve 24 by means of the bearings 25 and 26 respectively and they constitute, therefore, a coupling which allows both the sleeve 24 and the pistons to slide along the axis of body 1 and to rotate, at the same time, around it and in relation to each other.

Inside sleeve 24 are force mounted the free wheels 27 and 28 having discordant rotations and being made integral with the sleeve by means of seger rings 29 and 30, while on the outside of said sleeve 24 is secured the cogged wheel 31 which engages with rack 7 from which it receives its motion.

When compressed air is introduced into one of the chambers, for instance into 8, the horizontal displacement of rack 7 which follows causes the rotation of the cogged wheel 31, which, if neither one of the chambers 21 and 22 is under pressure, does not transmit any rotation to shaft 15.

In this situation, in fact, the cogged wheel 31 causes the rotation of sleeve 24 on which it is secured, and inside which the free wheels are fastened, so they can slide on the inside spacer 32.

The spacer 32 is also fastened, so it can slide, on shaft 15 and it performs only the function of spacing the rings 33 and 34 for the coupling of the free wheels 27 and 28 by a distance exceeding the sum of the height of the free wheels 27 and 28 themselves. Therefore, no rotation is transmitted to shaft 15 if no pressure is present in the chambers 20 and 21.

On the other hand, when compressed air is introduced into, let's say, chamber 20, the lowering of the ring-shaped piston 17 determines the coupling of the free wheel 27 with ring 34, which being integrally connected with shaft 15 determines the rotation of the same, since the rotation of the cogged wheel 24 has the same direction of rotation as the motion transmission of the free wheel.

The rotation is interrupted when piston 6 reaches the end of its stroke.

At this point an electro-valve intervenes to discharge the compressed air from the chamber 8 and 20 and the return springs 82 and 35 return the ring-shaped piston 17 and rack 7 into their initial, respective positions.

In order to allow the transmission of the rotation of shaft 15, both in the clockwise and in the counter-clockwise direction, the free wheels must, as has been said, be mounted with opposed directions of motion transmission and they are to engage alternatively with the rings 33 or 34.

Even in the case of a break-down of the automatic controls of the actuator, this type of actuator can work normally. In fact, when there is no pressure in the actuator, the free wheels return to their central position and disengage the cogged wheel from its coupling with shaft 15, which can then be manually operated, thereby making it possible to perform operations of manually opening and closing the valve.

From the description made so far, it can be observed that whenever one lateral cylinder, either 8 or 9, of the actuator and the corresponding internal chamber 20 or 21, are put under pressure, the rotation by a certain angle of shaft 15 and, therefore, also of the throttle of the valve integrally connected with said shaft is obtained. Therefore, in order to obtain a complete opening or closing rotation of the valve operated by the actuator, it is necessary to impress a series of equal commands, in order to obtain a series of rotations of shaft 15, all in the same direction. If, for instance, the opening of the valve connected with the actuator is controlled by the setting under pressure cylinder 8 and chamber 20 and if with each command a rotation of 15 degrees of shaft 15 is obtained, it can easily be understood that, in order to completely open the valve, which was originally closed, it will be necessary to give three commands, so that shaft 15 may rotate completely by 90 degrees. It is important to underline that, after the first command has been given to cylinder 8 and to chamber 20, which corresponds to the first rotation, in order to obtain the subsequent rotations, it is necessary to maintain the pressure in chamber 20 and to discharge from and introduce new pressure, time and time again only into cylinder 8. In fact, when the pressure is discharged from cylinder 8, the return spring 35 acting on piston 6 causes rack 7 to return to its initial position, but the subsequent opposite rotation of the cogged wheel 31 is not transmitted to shaft 15 thanks to the interposition of the free wheel 27, which in this case, by engaging in the opposite direction of rotation does not transmit the contrary motion.

Moreover, it can be understood that by appropriately varying the stroke of the rack 7 or the stroke relationship between the rack and the cogged wheel 31, it is possible to easily obtain all the desired chokings both during the opening and the closing procedures.

Figure 3:
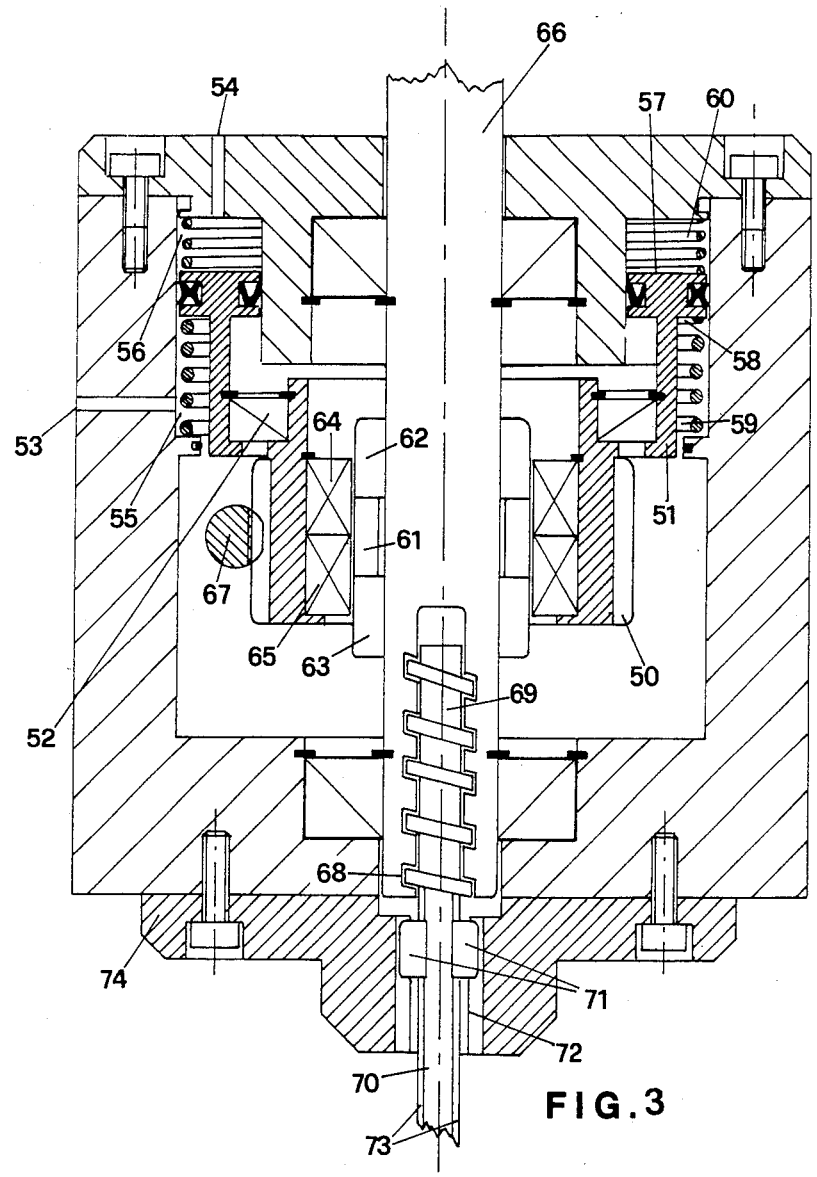
FIG. 3 represents a variation of the actuator according to the present invention.

A variation concerning the same inventive idea is represented in FIG. 3, where it can be observed that the cogged wheel 50 is connected co-axially by means of bearing 52 with a ring-shaped cogged wheel 51, having, in this case, a double effect.

The compressed air enter through the holes 53, 54 into the chambers 55 and 56 and acts either on the upper surface 57 or on the lower surface 58. The springs 59 and 60 are present and they return the piston to its initial postion when the pressure is discharged from the chambers 55 and 56.

In this variation of the inventive idea the spacer 61, disposed between the coupling rings 62 and 63 belonging respectively to the free wheels 64 and 65, is mounted so it can slide both in relation to the control shaft 66 of the on-off valve, and in relation to the free wheels 64 and 65 and its length is shorter than the sum of the lengths of the free wheels 64 and 65.

Thus, when the ring-shaped piston 51 is in an idle position, i.e. with the chambers 55 and 56 are without pressure, both the free wheels are partially coupled with the rings 62 and 63, so that the cogged wheel 50 and the shaft 66 are always integrated.

Since the free wheels are mounted with their directions opposed to each other, it follows that it will be impossible, if there is no pressure in the actuator, to manually rotate the shaft 66 and, therefore, to manually operate the valve.

On the other hand, when one of the two chambers 55 or 56 in under pressure, the piston 51 is displaced in relation to its idle position, so that a single free wheel will be coupled with one of the coupling rings 62 or 63, while the other one will be positioned in relation to the spacer 61.

Under such conditions a transversal displacement of the rack 67 transmits a rotation to the cogged wheel 50 and, therefore, to the shaft 66, which controls the on-off valve and the rotation will continue until the rack reaches the end of its stroke. The procedure can thus continue, as has already been described in the preceding case, if shaft 66 is directly connected with the throttle of the valve to be actuated.

In actuality, following what has been described so far concerning the variation of the execution form of the actuator, as shown in FIG. 3, such actuator behaves differently as compared with the actuator of FIG. 1, since, while this one can be manually operated if there is no pneumatic signal, under similar conditions the actuator of FIG. 3 remains blocked. This can become an advantage in the case of special installations, where the goal is that of obtaining controlled operations only, rather than manual temperings. On the other hand, if the goal is that of being able to operate manually the actuator of FIG. 3, it would be sufficient for the spacing ring 61 to be twice as long as the height of the two free wheels 64 and 65.

In FIG. 3 it can be observed that the actuator represented in cross section allows the guillotine movement of a valve, rather than the rotation of the throttle of a valve. In fact, at the lower end of the shaft controlling the on-off valve there is a nut screw 68 coupled with screw 69 which it present at the upper end of shaft 70, the lower end of which is connected with the on-off valve. Such coupling between the screw and the nut screw and the presence of the keys lodged in the slots 72 and 73 respectively in flange 74 of the actuator and of shaft 70, allow the rotational movement of shaft 66 in the straight-line movement of shaft 70.

Figure 4:
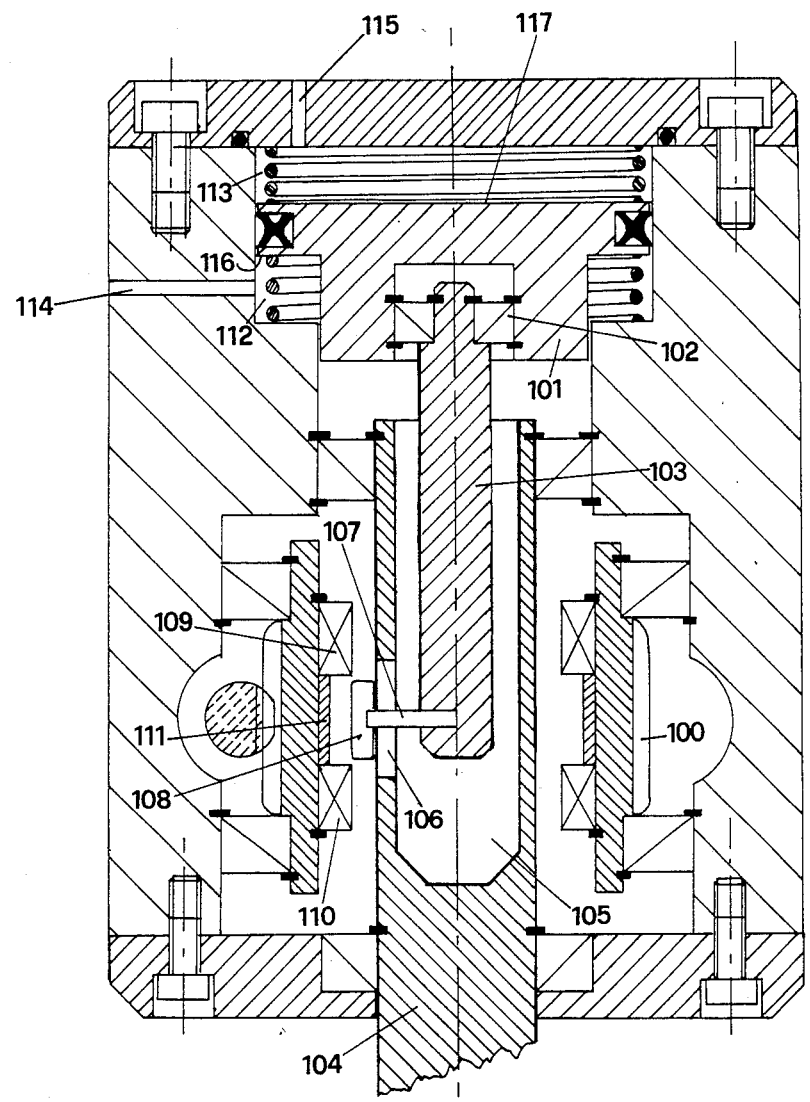
FIG. 4 represents another variation of the actuator according to the present invention.

Yet another variation of the constructive type of the same inventive idea is represented in FIG. 4, where it can be observed that the cogged wheel 100 is connected with the double-effect piston 101 which is made integral with the co-axial shaft 103 by means of bearing 102.

The compressed air entering the chambers 112 and 113 through the holes 114 or 115, acts either on the lower surface 116 or on the upper surface 117 to the double-effect piston 101 and moves it either upward or downwards.

The control shaft 104 of the on-off valve presents a hollow end 105 which is provided with a slot 106 through which is inserted pin 107 connecting the coupling 108 of the free wheels 109 and 110 with shaft 103.

The rod 103 moves axially because of the action of piston 101, so that it engages the above-mentioned free wheels by means of the coupling 108. Shaft 103 is thus made to rotate by the cogged wheel 100 and in turn causes the rotation of the shaft 104 controlling the on-off valve through slot 106 and pin 107.

Thus the same rotational movement of the actuator is obtained which was obtained with the device in FIG. 1.

Since the coupling 108 has a lower height than spacer 111, the actuator will be in an idle position when its chambers 112 and 113 are not under pressure, since in this situation coupling 108 is engaged with neither free wheels 109 or 110. In this case, as was the case of the actuator of FIG. 1, it will be possible to manually operate shaft 104 of the actuator represented in FIG. 4, and therefore to manually operate the valve.

If spacer 111 is bulit lower than the height of coupling 108, the condition of the automatic blocking of the actuator will be realized, when there is no pneumatic signal.

On the basis of what has been said, it will be noted that the actuator controlling the on-off valve in the three constructive forms which have been described hereinabove achieves the proposed goals.

The invention in its manufacturing phase may even acquire forms differring from those which have been illustrated and even variations of a constructive nature may be applied, without exceeding the scope of the patent rights of the present invention.

I claim:

1. An actuator device for the activation of no-off valves which comprises:
    a supporting body,
    a central shaft axially disposed within said supporting body,
    a cogged wheel defined by hollow cylindrical walls and disposed within said supporting body coaxial with said central shaft and able to transmit its rotation to said central shaft,
    a rack with associated pneumatic cylinders transversely disposed within said actuator device, said pneumatic cylinders activating said rack in its axial direction and in two directions, said rack engaging said cogged wheel,
    a pair of free wheels disposed inside the hollow cylindrical wall of the cogged wheel, said pair of free wheels engaging themselves integrally and alternately in discordant directions with one of a plurality of rings which is integral with the central shaft of the actuator and such that each of the two free wheels, alternatively, is able to transmit to the central shaft of the actuator the rotation of the cogged wheel, in either one of the two directions, which in turn is caused by the movement of the rack.

2. The actuator device according to claim 1, wherein the cogged wheel is mobile in the axial direction and is integrally connected with two opposing pistons acting within two cylindrical chambers disposed in the body of the actuator and co-axial with said cogged wheel, wherein the operation of said pistons, caused by introducing pressure into one of the two chambers housing said pistons causes the axial displacement of the cogged wheel and the subsequent coupling of one of the free wheels with one of the rings integrated with the shaft of the actuator.

3. The actuator device according to claim 2, wherein the overall dimension following the longitudinal axes of the two free wheels is smaller than the distance between two adjacent rings integrated with the central shaft of the actuator, said central shaft being thus free to be rotated manually by means of a hand-wheel, when the actuator is in its resting position.

4. The actuator device according to claim 2, wherein the overall dimension of the two free wheels following the longitudinal axes is greater than the distance between two adjacent rings integral with the central shaft of the actuator, said central shaft being prevented from rotating when the actuator is in its resting position.

5. The actuator device according to claim 1, wherein the two-way longitudinal movement of the cogged wheel is obtained by the action of a double-effect cylinder being co-axially disposed in the body of the actuator.

6. The actuator device according to claim 5, wherein the overall dimension of the two free wheels following the longitudinal axes is smaller than the distance between the rings integrated with the central shaft of the actuator, said shaft being free to rotate when the actuator is in its resting position.

7. The actuator device according to claim 5, wherein the overall dimension of the two free wheels following the longitudinal axes is greater than the distance between the two rings integrated with the central shaft of the actuator, said shaft being prevented from rotating when the actuator is in its resting position.

8. The actuator device according to claim 1, wherein the shaft of the actuator sets directly into rotation the element which opens and closes the valve.

9. The actuator valve device according to claim 1, wherein the shaft of the actuator is provided with a co-axially disposed screw-shaped chamber which engages with the screw end of a shaft for moving the shaft to control the element for the guillotine-type opening or closing of the valve.

10. The actuator device according to claim 9, wherein the distance between the two free wheels is greater than the height of the mobile coupling, the central shaft of the actuator being thus free to rotate when the actuator is in its resting position.

11. The actuator device according to claim 9, wherein the distance between the two free wheels is shorter than the height of the mobile coupling, the central shaft of the actuator being thus prevented from rotating when the actuator is in its resting position.

12. The actuator device according to claim 9, wherein the shaft of said actuator sets directly into rotation the element opening and closing the valve.

13. The actuator device according to claim 9, wherein the shaft of the actuator is provided with a co-axially disposed screw-shaped chamber which engages with the screw end of a shaft for moving the shaft to the element for the guillotine-type opening or closing of the valve.

14. The actuator device according to claim 1, wherein the motion transmission from the cogged wheel, carrying two free wheels coupled in discordant directions, to the shaft of the actuator is brought about by a mobile coupling means which alternatively engages itself with one of said free wheels, and which is integrated with another shaft disposed within the central shaft and connected with the piston of a double-effect pneumatic cylinder disposed on the body of the actuator.

* * * * *